(12) United States Patent
Wei (10) Patent No.: US 8,654,518 B2
(45) Date of Patent: Feb. 18, 2014

(54) ELECTRONIC APPARATUS

(75) Inventor: Chih-Sheng Wei, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 201 days.

(21) Appl. No.: 13/354,346

(22) Filed: Jan. 20, 2012

(65) Prior Publication Data

US 2013/0188303 A1 Jul. 25, 2013

(51) Int. Cl.
*G06F 1/16* (2006.01)

(52) U.S. Cl.
USPC .................................. 361/679.02; 455/575.3

(58) Field of Classification Search
USPC ........... 361/679.02, 679.09; 455/575.1–575.9
See application file for complete search history.

(56) References Cited

U.S. PATENT DOCUMENTS

| | | | |
|---|---|---|---|
| 7,184,805 B2* | 2/2007 | Cho et al. ................... | 455/575.4 |
| 7,496,194 B2* | 2/2009 | Jeun ........................ | 379/433.11 |
| 7,590,435 B2* | 9/2009 | Park et al. .................. | 455/575.3 |
| 7,865,151 B2* | 1/2011 | Cho .............................. | 455/90.3 |
| 7,866,000 B2* | 1/2011 | Lee et al. ......................... | 16/334 |
| 7,881,758 B2* | 2/2011 | Nagamine et al. ......... | 455/575.1 |
| 8,032,192 B2* | 10/2011 | Park ........................... | 455/575.4 |
| 8,041,405 B2* | 10/2011 | Urushihara et al. ........ | 455/575.1 |
| 8,054,615 B2* | 11/2011 | Lin et al. ................... | 361/679.07 |
| 8,199,465 B2* | 6/2012 | Shen ......................... | 361/679.01 |
| 8,233,072 B2* | 7/2012 | Taniguchi et al. ........ | 348/333.06 |
| 8,240,435 B2* | 8/2012 | Mast ............................... | 185/37 |
| 8,423,085 B2* | 4/2013 | Nakajima et al. ............ | 455/566 |
| 8,473,015 B2* | 6/2013 | Kim et al. ................... | 455/575.3 |
| 2004/0121825 A1* | 6/2004 | Ma et al. .................... | 455/575.4 |
| 2004/0121826 A1* | 6/2004 | Ma et al. .................... | 455/575.4 |
| 2011/0105202 A1* | 5/2011 | Kim ........................... | 455/575.1 |

\* cited by examiner

*Primary Examiner* — Lisa Lea Edmonds
(74) *Attorney, Agent, or Firm* — Jianq Chyun IP Office (57) ABSTRACT

An electronic apparatus is provided, which includes a first body, a second body, a supporting frame, and a pivoting-locking module. The two bodies overlap with each other. The supporting frame is pivoted onto the second body. The pivoting-locking module is disposed between the first body and the supporting frame. The pivoting-locking module includes a first pivoting-locking part and a plurality of second pivoting-locking parts. The first pivoting-locking part is fixed to the first body. The second pivoting-locking parts are movably attached to the supporting frame. When the second pivoting-locking parts are locked with the first pivoting-locking part, the second pivoting-locking parts may be pivoted relative to the first pivoting-locking part. The supporting frame may be pivoted relative to the second body only when the first body is pivoted to a predetermined position relative to the supporting frame by means of the first pivoting-locking part and the second pivoting-locking parts.

15 Claims, 8 Drawing Sheets

ELECTRONIC APPARATUS

BACKGROUND OF THE DISCLOSURE

1. Technical Field

The disclosure relates to an electronic apparatus and particularly relates to an electronic apparatus which uses a pivoting-locking module and a supporting frame to achieve the locking and pivoting between two bodies.

2. Background

As technology advances and develops, various kinds of electronic devices, such as mobile phones, tablet computers, and electronic books, etc., have been extensively used. These electronic devices make people's life more convenient and have become an indispensable part to people's life. These electronic devices are usually made small and light for the users to use them with hands and to carry them more easily.

Take the tablet computer as an example, when inputting text, the user may use a virtual keyboard displayed on the touch screen of the tablet computer to input text via touch control. However, touch control is inconvenient and inefficient for quick input of text. In that case, an extended physical keyboard may be applied to solve the problem.

SUMMARY

The disclosure provides an electronic apparatus, wherein an appearance of the electronic apparatus is changed by pivoting two bodies that are locked to each other.

The disclosure provides an electronic apparatus, which includes a first body, a second body, a supporting frame, and a pivoting-locking module. The first body and the second body overlap with each other. The supporting frame is pivoted to the second body. The pivoting-locking module is disposed between the first body and the supporting frame. The pivoting-locking module includes a first pivoting-locking part and a plurality of second pivoting-locking parts. The first pivoting-locking part is fixed to the first body. The second pivoting-locking parts are movably attached to the supporting frame. When the second pivoting-locking parts are locked to the first pivoting-locking part, the second pivoting-locking parts are pivotable relative to the first pivoting-locking part. The supporting frame is pivotable relative to the second body only when the first body is pivoted to a predetermined position relative to the supporting frame by means of the first pivoting-locking part and the second pivoting-locking parts.

Based on the above, the first body and the second body of the disclosure are locked and pivoted by the pivoting-locking module, and the combined two bodies of the electronic apparatus may form various appearances to satisfy different requirements.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION

Figure 1A:
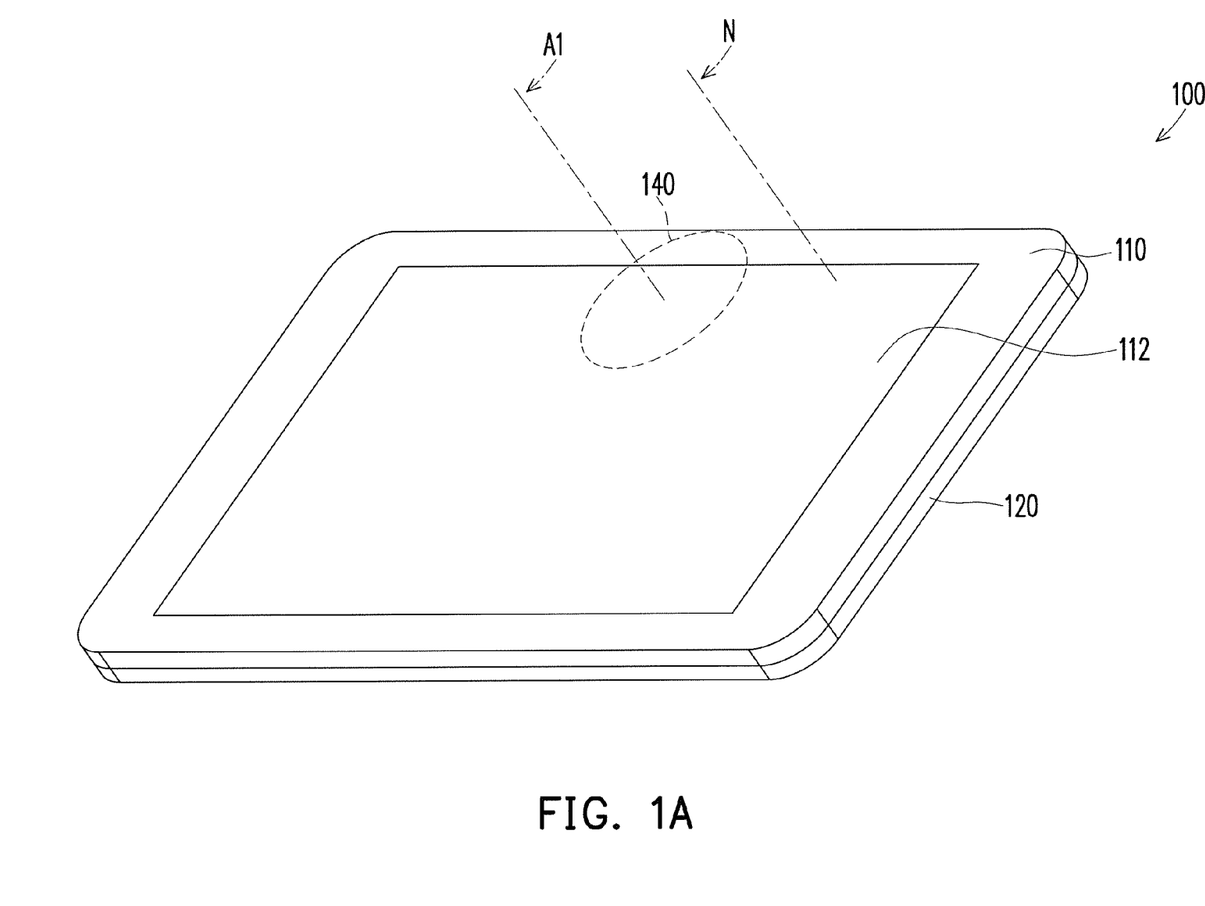
FIGS. 1A-1D are perspective views illustrating a transformation process of an electronic apparatus according to an embodiment of the disclosure.

FIGS. 1A~1D are perspective views illustrating a transformation process of an electronic apparatus according to an embodiment of the disclosure. Referring to FIG. 1A, in this embodiment, an electronic apparatus 100 includes a first body 110, a second body 120, a supporting frame 130, and a pivoting-locking module 140. The first body 110 may be a tablet computer, and the second body 120 may be an extended keyboard. The second body 120 and the first body 110 overlap with each other. The supporting frame 130 is pivoted to the second body 120. The pivoting-locking module 140 is disposed between the first body 110 and the supporting frame 130.

Figure 1B:
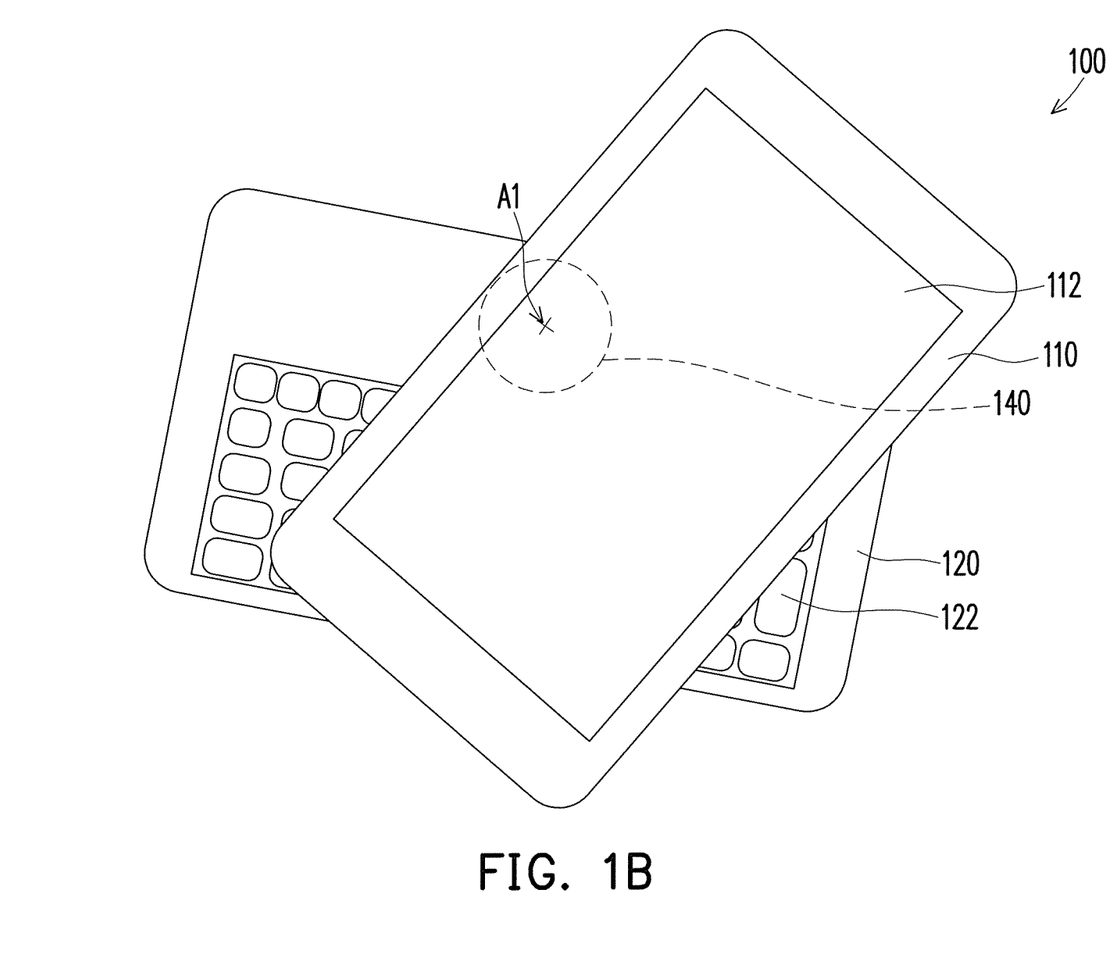

The pivoting-locking module 140 includes a first pivoting-locking part 142 and a plurality of second pivoting-locking parts 144. In this embodiment, two of the second pivoting-locking parts 144 that are opposite to each other are illustrated as an example. It is noted that, in FIGS. 1A~1C, the pivoting-locking module 140 is indicated by dotted lines to clearly illustrate a position of the pivoting-locking module 140. In FIG. 1D, the first body 110 and the first pivoting-locking part 142 are also depicted by dotted lines.

The first pivoting-locking part 142 is fixed to the first body 110. The second pivoting-locking parts 144 are movably attached to the supporting frame 130. The second pivoting-locking parts 144 and the first pivoting-locking part 142 may be locked to each other. When the second pivoting-locking parts 144 and the first pivoting-locking part 142 are locked to each other, the second pivoting-locking parts 144 are pivotable around a first pivot axis A1 relative to the first pivoting-locking part 142, as shown in FIG. 1B.

Figure 1C:
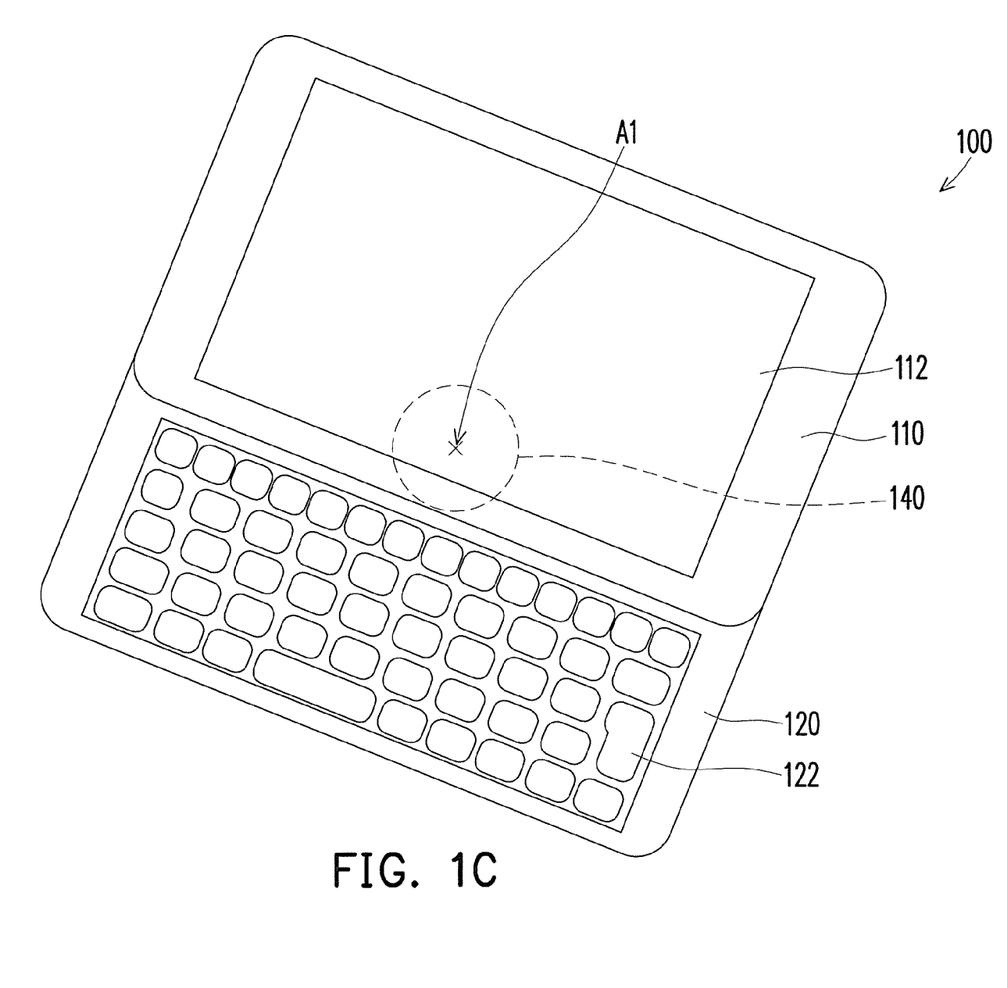
Figure 1D:
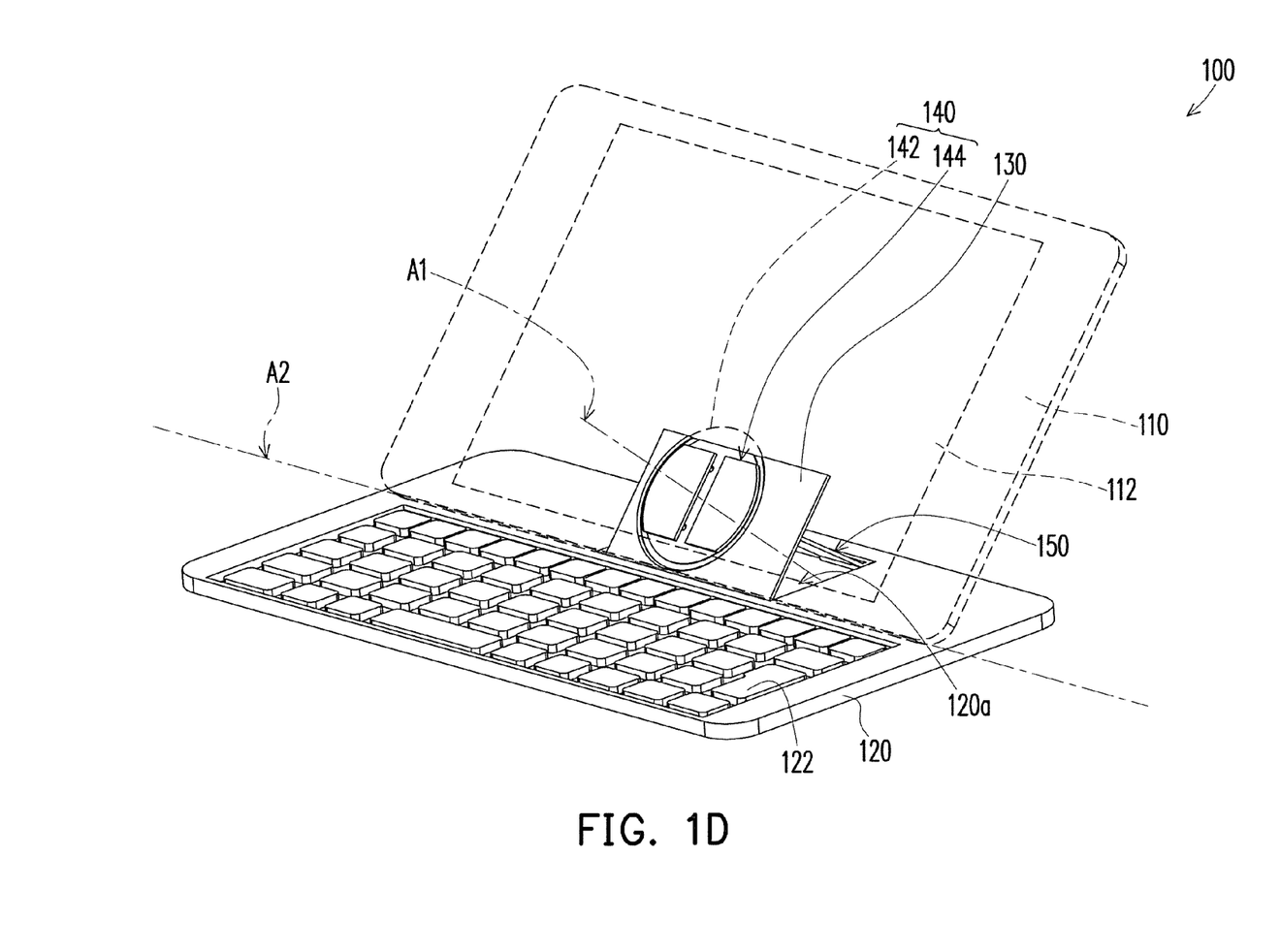

In addition, the supporting frame 130 is pivotable around a second pivot axis A2 relative to the second body 120, as shown in FIG. 1C, only when the first body 110 is pivoted to a predetermined position relative to the supporting frame 130 by means of the first pivoting-locking part 142 and the second pivoting-locking parts 144. In other words, when the first body 110 is pivoted to a position other than the predetermined position relative to the supporting frame 130 by means of the first pivoting-locking part 142 and the second pivoting-locking parts 144, the supporting frame 130 is pivotable around the second pivot axis A2 relative to the second body 120.

In this embodiment, the first pivot axis A1 is parallel to an overlap direction of the first body 110 and the second body 120. That is, the first pivot axis A1 is parallel to a normal direction N of a display region 112 of the first body 110. Moreover, the second pivot axis A2 is perpendicular to the overlap direction of the first body 110 and the second body 120. That is, the second pivot axis A2 is perpendicular to the normal direction N of the display region 112 of the first body 110.

In this embodiment, the second body 120 includes a keyboard region 122. When the second pivoting-locking parts 144 are pivoted around the first pivot axis A1 relative to the first pivoting-locking part 142, and the first body 110 is pivoted relative to the supporting frame 130 by the locking of the first pivoting-locking part 142 and the second pivoting-locking parts 144, the first body 110 gradually exposes the keyboard region 122, as shown in FIG. 1B.

After the first body 110 completely exposes the keyboard region 122, the first body 110 is in the predetermined position relative to the supporting frame 130, as shown in FIG. 1C, and the supporting frame 130 is pivotable around the second pivot axis A2 relative to the second body 120, so that the first body 110 may be lifted relative to the second body 120.

Therefore, when text input is required, the user only needs to pivot the first body 110 to the predetermined position relative to the second body 120, i.e. the first body 110 is in a position that completely exposes the keyboard region 122, and then pivot the supporting frame 130 relative to the second body 120 to lift the first body 110 that is locked to the supporting frame 130. The electronic apparatus 100 allows the user to input text via the keyboard region 122 of the second body 120 while watching the display region 112 of the first body 110, which is similar to the use of a laptop.

In this embodiment, the second body 120 further includes a receptacle space 120a for accommodating the supporting frame 130 and the pivoting-locking module 140. When the first body 110 and the second body 120 overlap with each other, the supporting frame 130 and the pivoting-locking module 140 are accommodated in the receptacle space 120a, which reduces the thickness of the electronic apparatus 100 and miniaturizes the electronic apparatus 100.

Figure 2A:
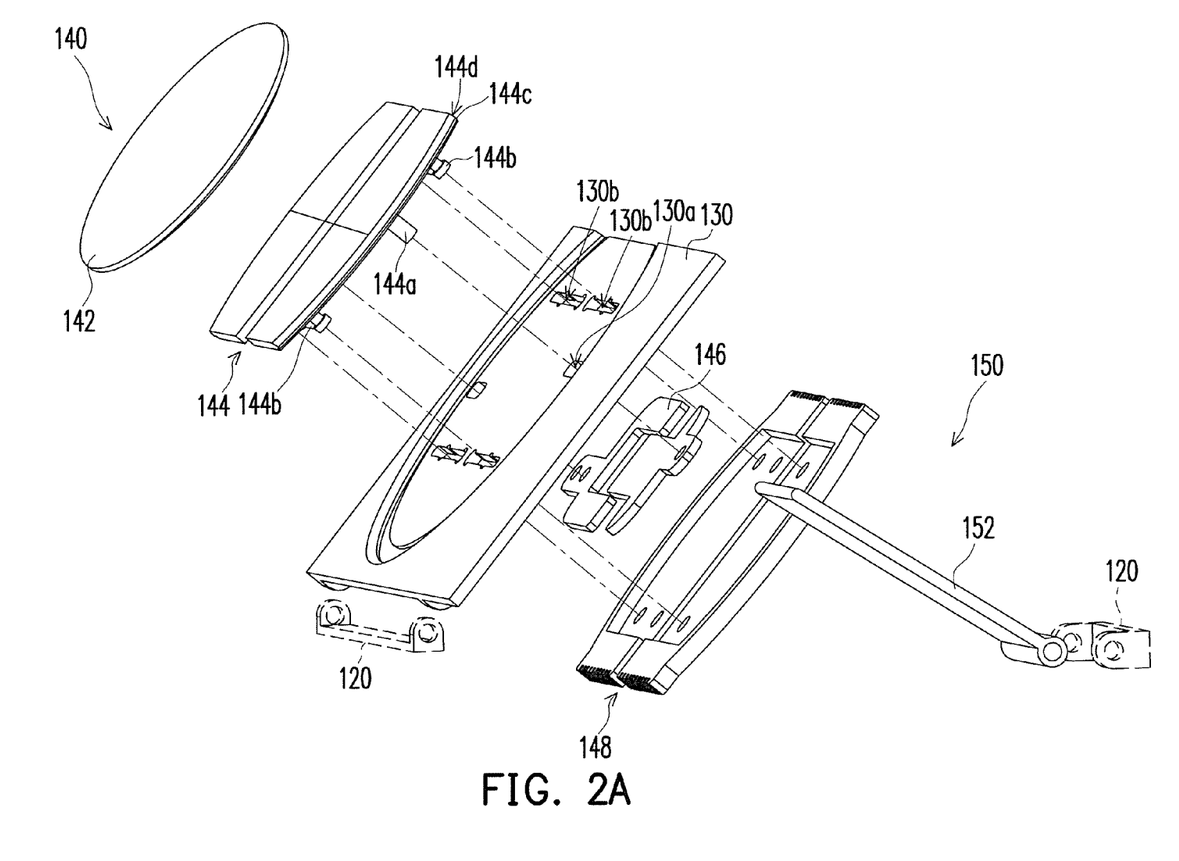
FIG. 2A is an exploded view of a pivoting-locking module and an ejector of FIG. 1D.
Figure 2B:
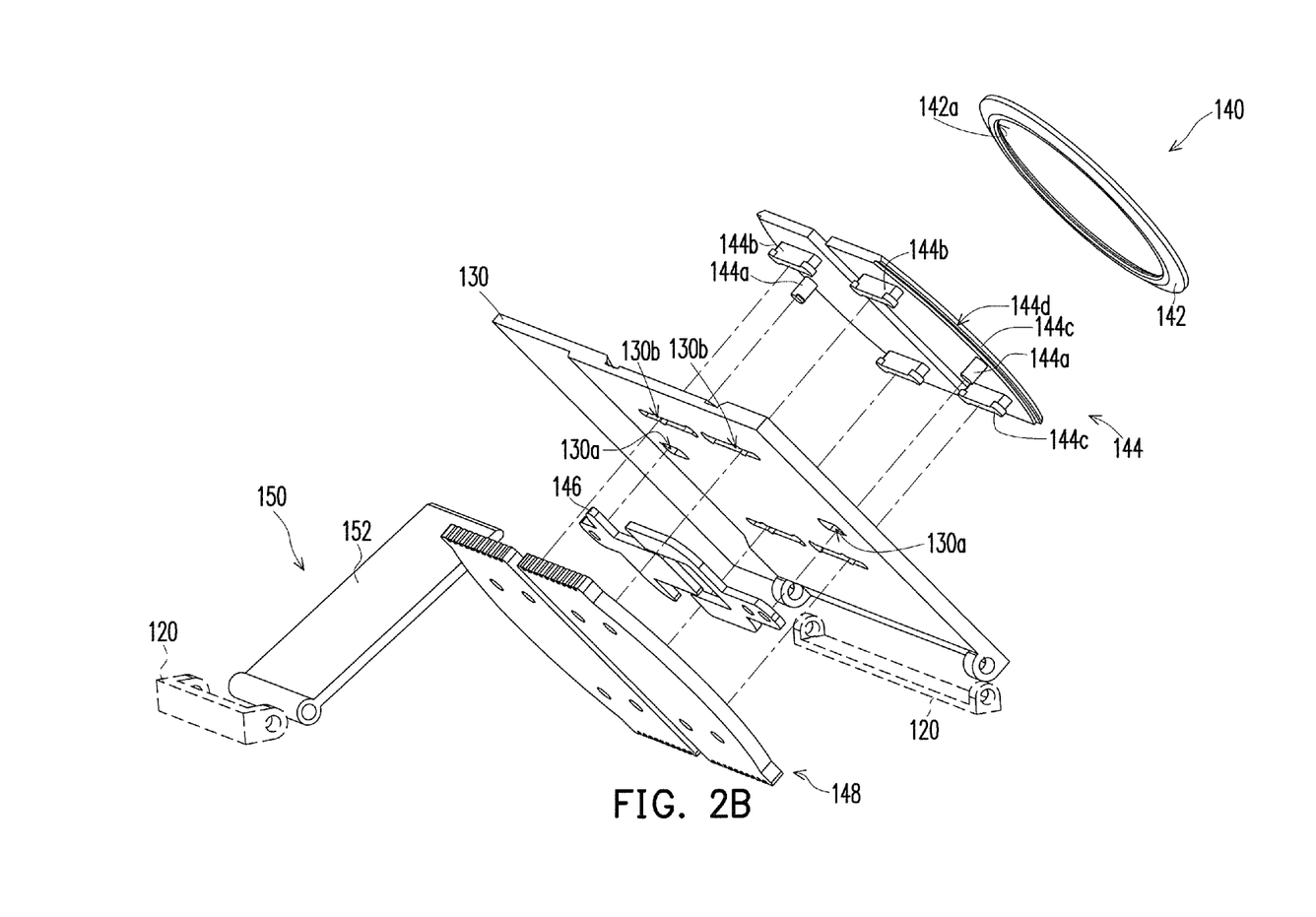
FIG. 2B is an exploded view of the pivoting-locking module and the ejector of FIG. 2A from another aspect.
Figure 3:
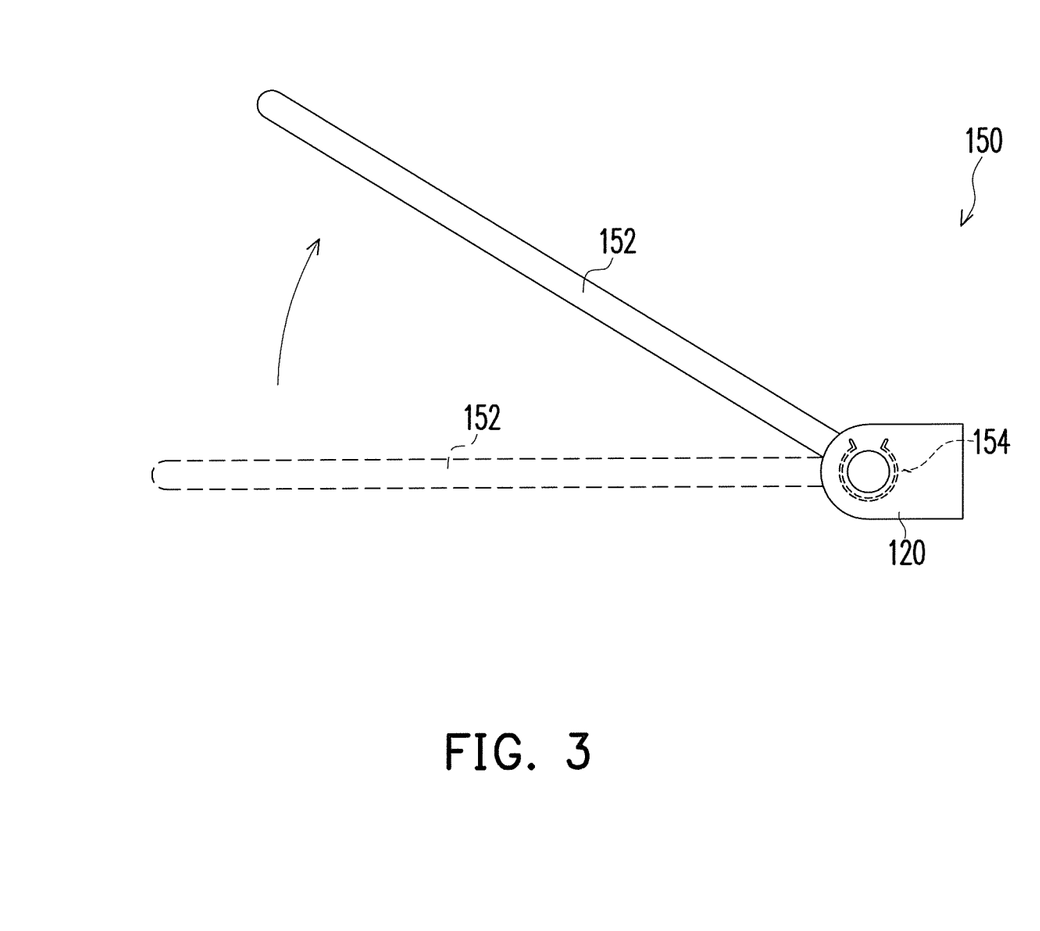
FIG. 3 illustrates a rotation of an ejecting shaft of FIG. 2A.

FIG. 2A is an exploded view of the pivoting-locking module and an ejector of FIG. 1D. FIG. 2B is an exploded view of the pivoting-locking module and the ejector of FIG. 2A from another aspect. FIG. 3 illustrates a rotation of an ejecting shaft of FIG. 2A. With reference to FIGS. 2A, 2B, and 3, the electronic apparatus 100 further includes an ejector 150, which is disposed between the second body 120 and the supporting frame 130. The ejector 150 pushes the supporting frame 130 relative to the second body 120, so that the supporting frame 130 is pivoted around the second pivot axis A2 relative to the second body 120 (shown in FIG. 1D). In addition, the ejector 150 is used to push the first body 110 to a predetermined angle relative to the second body 120 (as shown in FIG. 1D). Therefore, the first body 110 is not blocked by the second body 120 and does not hinder the user from operating the first body 110 or the second body 120.

More specifically, the ejector 150 includes an ejecting shaft 152 and an elastic element 154, wherein the elastic element 154 may be a torsion spring. The ejecting shaft 152 is pivoted to the second body 120. The elastic element 154 is disposed between the second body 120 and the ejecting shaft 152 and pivots the ejecting shaft 152 relative to the second body 120.

When the first body 110 and the second body 120 overlap with each other, as shown in FIG. 1A, the supporting frame 130 and the pivoting-locking module 140 are accommodated in the receptacle space 120a (as shown in FIG. 1D), and the ejecting shaft 152 (as depicted in dotted lines in FIG. 3) is pressed by the supporting frame 130 and received in the receptacle space 120a.

On the other hand, when the first body 110 completely exposes the keyboard region 122, as shown in FIG. 1C, the ejecting shaft 152 is not pressed by the supporting frame 130, and thus the ejecting shaft 152 (as depicted in solid lines in FIG. 3) is raised by an elastic force provided by the elastic element 154 and supports the supporting frame 130 to maintain the first body 110 in a lifted position, as shown in FIG. 1D.

With this configuration, when the first body 110 is in the predetermined position of FIG. 1D relative to the second body 120, the supporting frame 130 is ejected by the elastic element 154 of the ejector 150, so as to automatically lift the first body 110 and strengthen the support of the supporting frame 130.

Referring to FIGS. 2A and 2B, the pivoting-locking module 140 of this embodiment further includes a recovering element 146 disposed between the second pivoting-locking parts 144. In addition, each of the second pivoting-locking parts 144 includes a protrusion 144a, and the supporting frame 130 includes a plurality of holes 130a respectively corresponding to the positions of the protrusions 144a. The protrusions 144a respectively pass through the corresponding holes 130a to be fixed to the recovering element 146, so as to enable the recovering element 146 to move the second pivoting-locking parts 144 relative to the supporting frame 130.

Therefore, when the second pivoting-locking parts 144 are opened/closed relative to the supporting frame 130, the recovering element 146 is able to recover the locking between the second pivoting-locking parts 144 and the first pivoting-locking part 142. In this embodiment, the recovering element 146 is, for example, an elastic body, such as a flat spring module.

In this embodiment, the pivoting-locking module 140 further includes a plurality of latches 148, which are respectively fixed to the second pivoting-locking parts 144. When the latches 148 respectively receive an external force, the latches 148 are moved relative to the supporting frame 130, which concurrently moves the corresponding second pivoting-locking parts 144. With this configuration, the relative movement between the latches 148 is used to release the locking between the first pivoting-locking part 142 and the second pivoting-locking parts 144, so as to separate the first body 110 from the second body 120. Moreover, after the latches 148 are moved relatively, the second pivoting-locking parts 144 are moved back to the original positions by the elastic force provided by the recovering element 146, so as to lock the first pivoting-locking part 142 to the second pivoting-locking parts 144 again.

Furthermore, each of the second pivoting-locking parts 144 respectively includes a plurality of sliding blocks 144b, and the supporting frame 130 includes a plurality of sliding grooves 130b respectively corresponding to the positions of the sliding blocks 144b. When the sliding blocks 144b pass through the supporting frame 130 to be fixed to the corresponding latches 148, the sliding blocks 144b are maintained slidable in the sliding grooves 130b, so as to slidably attach the second pivoting-locking parts 144 to the supporting frame 130. With this configuration, the positions of the second pivoting-locking parts 144 are adjustable so as to be locked to the first pivoting-locking part 142.

Figure 4:
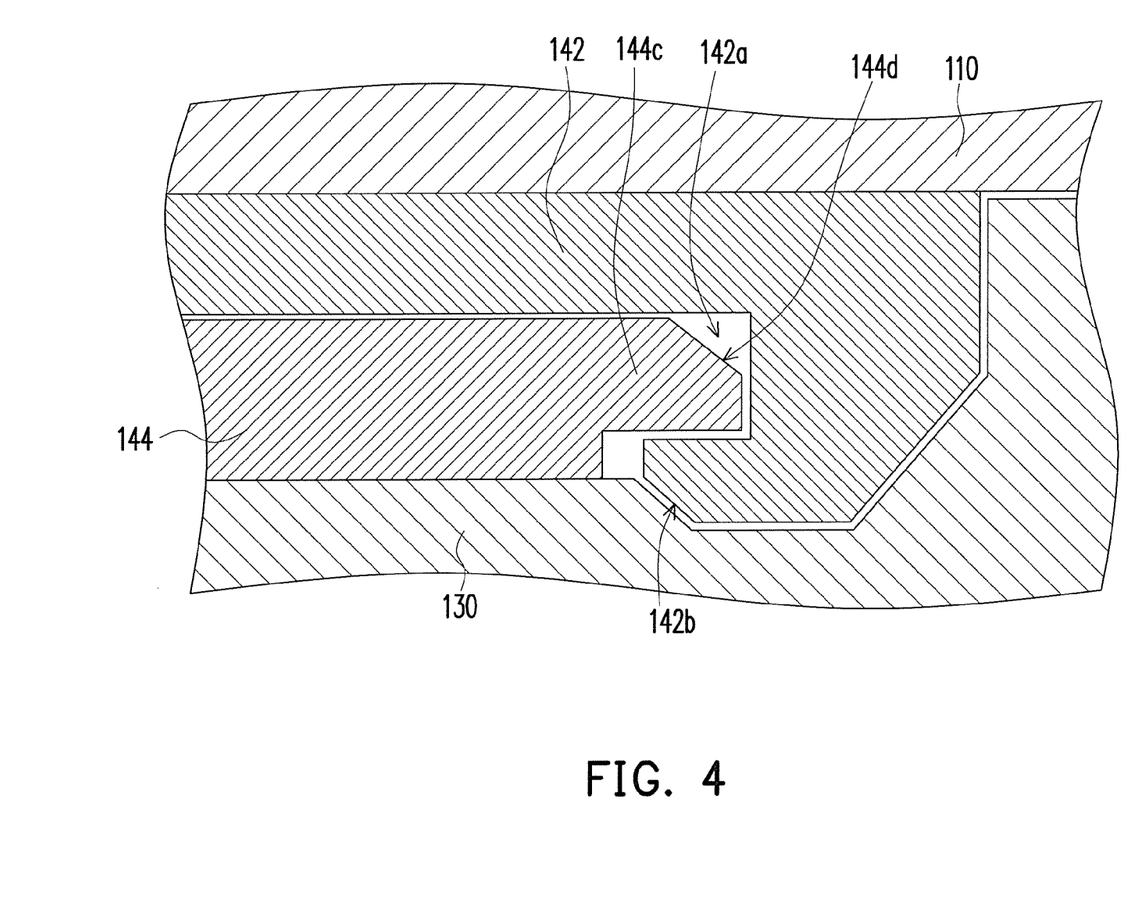
FIG. 4 is a cross-sectional view showing the locking between a first pivoting-locking part and a second pivoting-locking part of FIG. 2A.

FIG. 4 is a schematic cross-sectional view showing the locking between the first pivoting-locking part and the second pivoting-locking part of FIG. 2A. Referring to FIGS. 2A, 2B, and 4, the first pivoting-locking part 142 of this embodiment includes a circular groove 142a, and each of the second pivoting-locking parts 144 includes an arc flange 144c. When the arc flanges 144c are locked to the circular groove 142a, the first body 110 is integrated with the second body 120 (as depicted in FIG. 1D), and the arc flanges 144c are maintained pivotable in the circular groove 142a, so as to pivot the first pivoting-locking part 142 and the second pivoting-locking parts 144 around the first pivot axis A1 (as shown in FIG. 1D).

It is noted that, in this embodiment, the two second pivoting-locking parts 144 are symmetrically disposed on the supporting frame 130 and thus FIG. 4 illustrates one arc flange 144c fitted to the circular groove 142a as an example.

Moreover, the first pivoting-locking part 142 includes a first guiding slant surface 142b, and each of the second pivoting-locking parts 144 includes a second guiding slant surface 144d. Therefore, when an external force is applied to lock the second pivoting-locking parts 144 and the first pivoting-locking part 142, the first guiding slant surface 142b and the second guiding slant surfaces 144d are coordinated with each other to guide and lock the first pivoting-locking part 142 and the second pivoting-locking parts 144. Accordingly, the first body 110 is integrated with the second body 120.

To conclude the above, the first body and the second body of the disclosure are locked and pivoted by the pivoting-locking module, and the integrated two bodies of the electronic apparatus form various appearances to satisfy different requirements in different occasions. In addition, when the electronic apparatus includes the ejector, the supporting frame is ejected by the elastic force of the elastic element for automatically lifting the first body and strengthening the support to the supporting frame. Furthermore, the second body has the receptacle space. When the first body and the second body overlap with each other, the supporting frame and the pivoting-locking module are accommodated in the receptacle space, which facilitates the miniaturization of the electronic apparatus. Moreover, the pivoting-locking module further includes the recovering element or the plurality of latches for facilitating the disassembly of the first body and the second body.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic apparatus, comprising:
    a first body;
    a second body overlapping with the first body;
    a supporting frame pivoted to the second body; and
    a pivoting-locking module disposed between the first body and the supporting frame, wherein the pivoting-locking module comprises:
        a first pivoting-locking part fixed to the first body; and
        a plurality of second pivoting-locking parts, movably attached to the supporting frame, wherein the second pivoting-locking parts are pivotable relative to the first pivoting-locking part when the second pivoting-locking parts and the first pivoting-locking part are locked to each other, and the supporting frame is pivotable relative to the second body only when the first body is pivoted to a predetermined position relative to the supporting frame by means of the first pivoting-locking part and the second pivoting-locking parts.

2. The electronic apparatus according to claim 1, wherein the second pivoting-locking parts are pivotable around a first pivot axis relative to the first pivoting-locking part, and the first pivot axis is parallel to an overlap direction of the first body and the second body; the supporting frame is pivotable around a second pivot axis relative to the second body, and the second pivot axis is perpendicular to the overlap direction of the first body and the second body.

3. The electronic apparatus according to claim 1, wherein the second body comprises a receptacle space that accommodates the supporting frame and the pivoting-locking module.

4. The electronic apparatus according to claim 1, further comprising:
    an ejector disposed between the second body and the supporting frame and ejecting the supporting frame relative to the second body to pivot the supporting frame relative to the second body.

5. The electronic apparatus according to claim 4, wherein the ejector comprises:
    an ejecting shaft pivoted to the second body; and
    an elastic element disposed between the second body and the ejecting shaft and pivoting the ejecting shaft relative to the second body.

6. The electronic apparatus according to claim 4, wherein the ejector pushes the first body to a predetermined angle relative to the second body, and the first body is not blocked by the second body.

7. The electronic apparatus according to claim 1, wherein the first pivoting-locking part comprises a circular groove and each of the second pivoting-locking parts comprises an arc flange, and the arc flanges are pivotable relative to the circular groove when the arc flanges are locked to the circular groove.

8. The electronic apparatus according to claim 1, wherein the pivoting-locking module further comprises:
    a recovering element disposed between the second pivoting-locking parts and moving the second pivoting-locking parts relative to the supporting frame to recover the locking between the second pivoting-locking parts and the first pivoting-locking part.

9. The electronic apparatus according to claim 8, wherein each of the second pivoting-locking parts comprises a protrusion and the supporting frame comprises a plurality of holes, and the protrusions respectively pass through the holes to be fixed to the recovering element.

10. The electronic apparatus according to claim 1, wherein the first pivoting-locking part comprises a first guiding slant surface and each of the second pivoting-locking parts comprises a second guiding slant surface, and the first guiding slant surface and the second guiding slant surfaces are coordinated to guide the first pivoting-locking part and the second pivoting-locking parts to lock to each other.

11. The electronic apparatus according to claim 1, wherein the second pivoting-locking parts are slidably disposed on the supporting frame.

12. The electronic apparatus according to claim 11, wherein each of the second pivoting-locking parts comprises a sliding block and the supporting frame comprises a plurality of sliding grooves, and the sliding blocks are slidable in the sliding grooves respectively.

13. The electronic apparatus according to claim 1, wherein the pivoting-locking module further comprises:
    a plurality of latches respectively fixed to the second pivoting-locking parts and moving the second pivoting-locking parts relative to the supporting frame to release the locking between the first pivoting-locking part and the second pivoting-locking parts when being applied with an external force.

14. The electronic apparatus according to claim 13, wherein each of the second pivoting-locking parts comprises a sliding block and the supporting frame comprises a plurality of sliding grooves, the sliding blocks are respectively slidable in the sliding grooves, and each of the sliding blocks passes through the supporting frame to be fixed to the corresponding latch.

15. The electronic apparatus according to claim 1, wherein the first body is a tablet computer and the second body is an extended keyboard comprising a keyboard region, and the first body completely exposes the keyboard region when the first body is pivoted to the predetermined position relative to the supporting frame by means of the first pivoting-locking part and the second pivoting-locking parts.

* * * * *